US012317127B2

(12) United States Patent
Chuang et al.

(10) Patent No.: US 12,317,127 B2
(45) Date of Patent: May 27, 2025

(54) ADAPTABLE CELLULAR SESSION FOR LOW LATENCY AND POWER SAVING

(71) Applicant: GOOGLE LLC, Mountain View, CA (US)

(72) Inventors: Po-Ying Chuang, Taipei (TW); Tai-Lun Lo, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 322 days.

(21) Appl. No.: 17/869,628

(22) Filed: Jul. 20, 2022

(65) Prior Publication Data

US 2022/0408306 A1 Dec. 22, 2022

Related U.S. Application Data

(63) Continuation of application No. PCT/US2021/037835, filed on Jun. 17, 2021.

(51) Int. Cl.
*H04W 28/02* (2009.01)
*H04W 28/08* (2023.01)
*H04W 76/10* (2018.01)

(52) U.S. Cl.
CPC ... *H04W 28/0273* (2013.01); *H04W 28/0917* (2020.05); *H04W 76/10* (2018.02)

(58) Field of Classification Search
CPC ............. H04W 28/0273; H04W 76/10; H04W 28/0917
See application file for complete search history.

(56) References Cited

U.S. PATENT DOCUMENTS

| | | |
|---|---|---|
| 2012/0188928 A1 | 7/2012 | Wang et al. |
| 2014/0226548 A1 | 8/2014 | Son et al. |
| 2019/0364541 A1* | 11/2019 | Ryu ...................... H04W 80/10 |
| 2020/0275513 A1* | 8/2020 | Park ...................... H04W 76/20 |
| 2022/0030533 A1* | 1/2022 | Munz .................. H04W 56/005 |
| 2022/0360977 A1* | 11/2022 | Kim ........................ H04L 65/80 |
| 2022/0386401 A1* | 12/2022 | Qiao ..................... H04W 48/16 |

(Continued)

FOREIGN PATENT DOCUMENTS

WO 2019182430 A1 9/2019

OTHER PUBLICATIONS

International Search Report and Written Opinion mailed Mar. 18, 2022 for PCT/US2021/037835, 10 pages.

(Continued)

*Primary Examiner* — Michael Thier
*Assistant Examiner* — Tracy Lauren Colbert

(57) ABSTRACT

A user equipment (UE) determines that a protocol data unit (PDU) session comprises an adaptable PDU session. The UE determines whether a current energy mode of the UE comprises an energy-saving mode. In response to determining that the current energy mode of the UE comprises the energy-saving mode, the UE establishes the adaptable PDU session in a non-always-on mode; and in response to determining that the current energy mode of the UE does not comprise the energy-saving mode, the UE establishes the adaptable PDU session in an always-on mode. Further, the UE can initially establish a mode of a plurality of adaptable PDU sessions as the non-always-on mode, when connecting to a certain type of network.

19 Claims, 4 Drawing Sheets

(56) References Cited

U.S. PATENT DOCUMENTS

2023/0024493 A1\* 1/2023 Sridharan ............. H04L 1/1887
2023/0370292 A1\* 11/2023 Qian ..................... H04L 67/141

OTHER PUBLICATIONS

3GPP, "3GPP TS 23.501; V16.7.0"; 3rd Generation Partnership Project; Technical Specification Group Services and System Aspects; System architecture for the 5G System (5GS); Stage 2 (Release 16); Dec. 2020; 442 pages.
International Preliminary Report on Patentability mailed Dec. 28, 2023 for PCT Application No. PCT/US2021/037835, 7 pages.

\* cited by examiner

ADAPTABLE CELLULAR SESSION FOR LOW LATENCY AND POWER SAVING

CROSS-REFERENCE TO RELATED APPLICATIONS

The present application is a continuation application of International Application Serial No. PCT/US2021/037835, entitled "Adaptable 5G Session for Low Latency and Power Saving" and filed on Jun. 17, 2021, the entirety of which is incorporated by reference herein.

BACKGROUND

User equipment (UE), such as smartphones, smartwatches, tablets, and vehicle entertainment systems, are commonly able to connect to one or more wireless networks, such as those implemented by employing Third Generation Partnership Project (3GPP), Fourth Generation (4G), Long Term Evolution (LTE), and Fifth Generation (5G) New Radio (NR) radio access technologies (RATs).

As discussed in the "System architecture for the 5G System (5GS) (3GPP TS 23.501 version 15.10.0 Release 15)" standard, a UE uses a Control Plane Protocol Stack signaling technique between the UE and a network (via the 5G Access Network (5G-AN), the Access and Mobility Management Function (AMF) and the Session Management Function (SMF)) to "bring up" a User Plane (UP) connection.

For certain RATs, such as LTE, when a UE transitions from an idle state to a connected state, the user plane (UP) connections are established for all active packet data network (PDN) connections. Hence the downlink data for one single PDN connection may require that all PDN connections set up their UP connections, which can result in the UE consuming more energy than otherwise required to maintain the single PDN connection solely.

As further discussed in the "System architecture" standard referenced above, an "always-on" protocol data unit (PDU) session is a PDU session for which User Plane (UP) resources have to be activated during every transition from connection management (CM)-idle mode to CM-connected state. Conversely, a "non-always-on" PDU session is a PDU session that is not an "always-on" PDU session. When a UE attempts to invoke a service request procedure to request activation of a UP connection for a "non-always-on" PDU session, particular network managers may require a quantity of pending uplink user data. Further, a UE in a CM-connected state may invoke a service request procedure to request the independent activation of the UP connection of existing PDU sessions.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
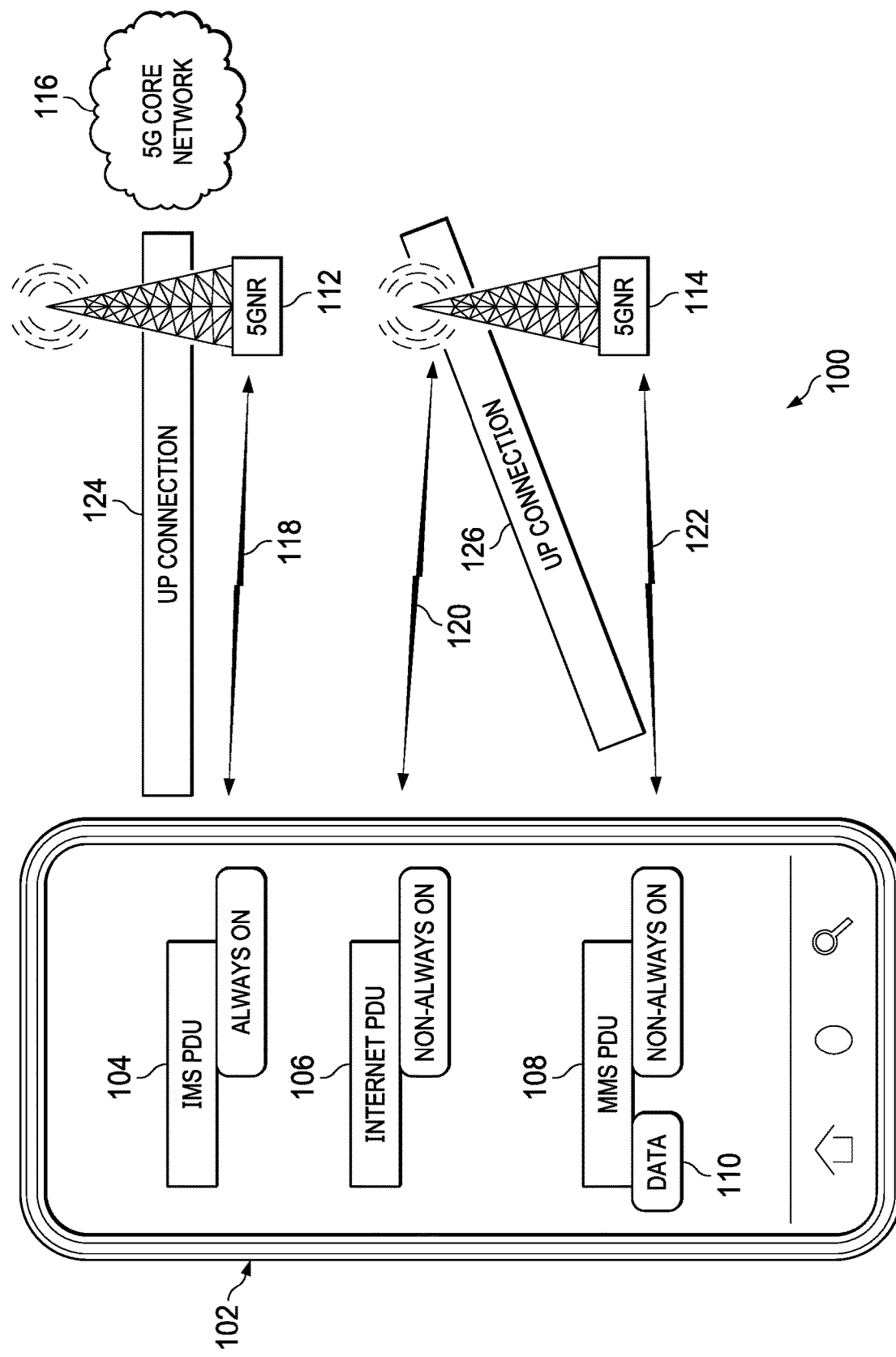
FIG. 1 is a block diagram of an example wireless communication network in accordance with some embodiments.

The present disclosure describes systems and techniques generally directed to reducing latency and providing power savings when establishing protocol data unit (PDU) sessions that may utilize a corresponding RAT, such as a 5G NR RAT, given by way of example.

In at least one embodiment, a UE is configured to adaptively establish either an always-on PDU session or a non-always-on PDU session responsive to a current energy mode of the UE, e.g., depending on a preference for low-latency or energy-saving conditions.

After migrating from one RAT to another RAT, to conserve energy, the UE may choose to set up the UP connection for a specific PDU session with pending data. Further, the UE may still establish an always-on PDU session to save time (lowering the latency) before sending data. Even if there is no uplink data to be sent, the UE may still need one always-on PDU session to set up the UP connection, which may consume additional energy. Further, one non-always-on PDU session may set up the UP connection on demand to conserve energy, but the behavior introduces additional latency before the UE can send uplink data. Moreover, in some RATs the always-on property may not be changed during the lifetime of a PDU session.

In some example embodiments, the UE may employ an adaptive PDU session for the UE to mimic (e.g., spoof) always-on PDU sessions to lower latency while not sacrificing an ability to fallback to non-always-on PDU sessions to conserve energy, and vice versa. In these example techniques, the UE may establish all PDU sessions to be non-always-on in a beginning stage, so that the UE can change its behavior based on energy-sensitive conditions (i.e., adaptable sessions). Further, the UE considers the energy-sensitive condition when it fills in an Uplink Data Status information element (IE) in a service request. That is, the UE can manipulate each PDU session to, in effect, "pretend" that the PDU session is either always-on or non-always-on, depending on current preferences of the UE or the user, or both, for either low-latency or power-saving preferences.

In normal cases, a network releases a radio resource control (RRC) connection after 10 seconds. Each time an RRC connection is released it can take up to approximately 200 milliseconds (ms) to restore the RRC connection via a service request procedure. Thus, in this example scenario, for a UE utilizing the techniques described below, a latency improvement of approximately 2% could be observed (e.g., 200 ms/10 sec=2%).

Initially, a UE, when present in a particular radio access network (RAN) or when switching from one RAT to another RAT, may establish all PDU sessions with a network to be in a non-always-on mode. By entering the non-always-on mode, the UE falls back to power-saving behaviors. Thus, the energy consumption may be comparable to the device without this technique.

For ease of reference, the systems and techniques illustrated and described herein are done so in the example context of adaptive PDU session establishment for 5G NR and, in some instances, for when a UE transitions from a 4G LTE RAT to a 5G NR RAT. However, this example context is for illustrative purposes only, and it will be understood that reference to a particular RAT, such as 5G NR or 4G LTE, applies equally to other RATs with the same or similar PDU session aspects unless otherwise specified.

FIG. 1 is a block diagram of an example wireless communication network 100 having a UE 102 employing PDU sessions in accordance with some embodiments. In the depicted network 100, the UE 102 has established an internet protocol (IP) multimedia subsystem (IMS) PDU session 104, an Internet PDU session 106, and an Internet Multimedia Messaging Service (MMS) PDU session 108. For the example shown in FIG. 1, the IMS PDU session 104 is currently operating in an always-on mode, while the Internet PDU session 106 and the MMS PDU session 108 are each currently operating in a non-always-on mode. As shown, the MMS PDU session 108 currently has pending data 110 to be sent.

In the depicted scenario, the UE 102 is currently in range of base stations 112 and 114, and a core network 116, such as a 5G core network. Before establishing a PDU session, the UE 102 determines whether the particular PDU is currently configured for an always-on mode or a non-always-on mode. For example, the UE 102 may access a database storing PDU attributes to aid in determining the current configuration mode for the particular PDU. The UE 102 may then establish one or more PDU sessions in accordance with their respective determined mode. As shown, the UE 102 has established PDU sessions for the IMS PDU 104 (always-on), the Internet PDU 106 (non-always-on), and the MMS PDU 108 (non-always-on). The UE 102 and the base station 112 utilize a wireless connection 118 for the IMS PDU session 104, a wireless connection 120 for the Internet PDU session 106, and a wireless connection 122 for the MMS PDU session 108.

If the UE 102 is in an idle state and there is pending uplink data for the MMS PDU session 108, the UE 102 may use a service request to establish the UP connections for the IMS PDU session 104 and the MMS PDU session 108. In the depicted scenario, the UE 102 has established a UP connection 124 between the UE 102 and the core network 116, for the IMS PDU session 104, and a UP connection 126 between the UE 102 and the core network 116 for the MMS PDU session 108.

For purposes of this scenario, the IMS PDU session 104 is always-on, and thus the UE 102 establishes the UP connection for the IMS PDU session 104 when no uplink data is pending for the IMS PDU session 104. Assuming that the Internet PDU session 106 then has uplink data pending (not shown in FIG. 1), the UE 102 may initiate a service request again for the Internet PDU session 106, before the data can be transmitted.

Figure 2:
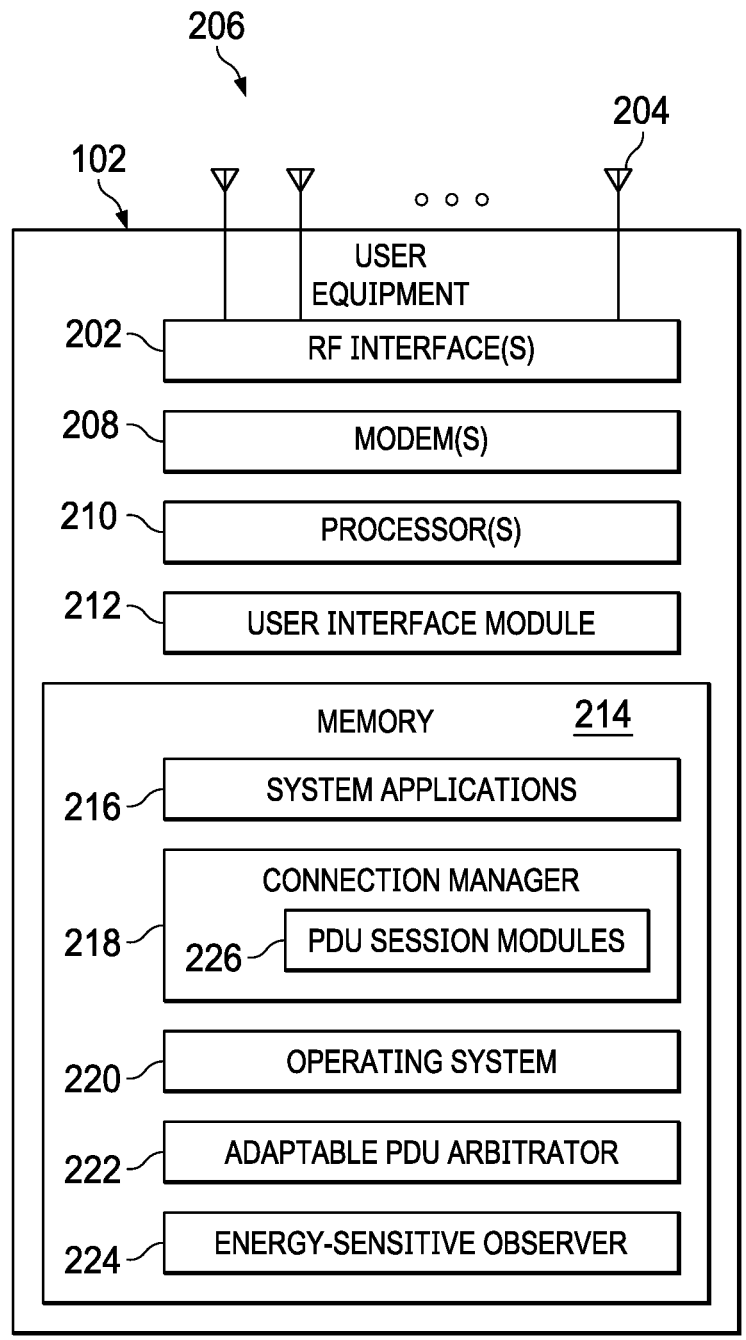
FIG. 2 is a block diagram of a UE of the example wireless communication network of FIG. 1 in accordance with some embodiments.

FIG. 2 illustrates an example hardware implementation of the UE 102 of the wireless communication network 100 of FIG. 1 in accordance with some embodiments. In the depicted configuration, the UE 102 includes a radio frequency (RF) interface 202, one or more antenna arrays 206, each having one or more antennas 204, and a corresponding modem of the modem(s) 208. For example, for wireless communications, the UE 102 may include a set of one or more antenna arrays 206, one or more RF interface(s) 202, and one or more modem(s) 208 to support each of 4G LTE and 5G NR signaling.

The UE 102 further includes one or more processors 210 and at least one memory 214 (e.g., which may include one or more non-transitory computer-readable media). The one or more processors 210 can include, for example, one or more central processing units (CPUs), graphics processing units (GPUs), artificial intelligence (AI) accelerators, or other application-specific integrated circuits (ASICs), and the like. The memory 214 can include any of a variety of media used by electronic devices to store data and/or executable instructions, such as random access memory (RAM), read-only memory (ROM), caches, Flash memory, solid-state drive (SSD), or other mass-storage devices, and the like. For ease of illustration and brevity, the term "memory" is used to refer to the "memory 214", but it will be understood that reference to "memory 214" shall apply equally to other types of storage media unless otherwise noted.

The UE 102 further includes a user interface module 212. The user interface module 212 can be configured to receive inputs from a user of the UE 102. The user interface module 212 can include a graphical user interface (GUI) that receives the input information via a touch input. In other instances, the user interface module 212 includes an intelligent assistant that receives the input information via an audible input. For example, a user may provide inputs via the user interface module 212 to manually enable or disable one or more of the modems 208.

The memory 214 is used to store one or more software applications in the form of sets of executable software instructions and associated data that manipulate the one or more processors 210, modems 208, RF interfaces 202, user interface module 212, and other components of the UE 102 to perform the various functions described herein and attributed to the UE 102. The software includes, for example, one or more system applications 216, a connection manager 218, an operating system 220, an adaptable PDU arbitrator 222, and an energy-sensitive observer 224.

The system applications 216 may include a system manager, such as any form of a control application, software application, signal-processing and control module, code that is native to a particular device, an abstraction module or gesture module, and the like. The system applications 216 may also include system components and utilities associated with implementing adaptable PDU functions, such as the connection manager 218, the adaptable PDU arbitrator 222, and the energy-sensitive observer 224.

The connection manager 218 manages or directs the UE 102 in utilizing one or more wireless connections with one or more base stations. The connection manager 218 may include, be coupled with, or have access to components for measuring characteristics of a connection, scanning for service, receiving connection parameters, acquiring a connection, releasing a connection, or the like. In various aspects of adaptive connection management, the connection manager 218 may also alter connection parameters, such as to reduce data activity associated with a connection or prevent the acquisition of a connection.

The adaptable PDU arbitrator 222 may include a static (predefined) or dynamic (runtime/updated) database for use in determining whether a PDU session may be an adaptable PDU session. In some embodiments, the database may use different bases. For example, the static or dynamic database may use an operator-ID basis (e.g., public land mobile network identity (PLMN-ID), mobility country code-mobility network code (MCC-MNC), an access point name (APN) basis, a single network slice selection assistance information (S-NSSAI) basis or may combine one or more PDU session attributes to determine whether the PDU session is adaptable. For example, the adaptable PDU arbitrator 222 may include an adaptable PDU list or table.

For example, some operators or carriers may require the UE to use the always-on property for some specific PDU sessions. For example, an internet protocol (IP) multimedia subsystem (IMS) PDU session may be requested to be always-on to lower latency. Conversely, a carrier or operator may not specify the type of PDU session for an internet PDU session. The UE may follow the requirements for that specific PDU session. However, for other PDU sessions with no restrictions, the UE may apply this example technique for advantageous performance. Information regarding the requirements of such operators or carriers may be stored in the adaptable PDU arbitrator 222.

In some embodiments, the UE 102 may utilize other logic to determine whether one PDU session is adaptable or not. For example, the UE 102 may use a pair of counters and thresholds, or may use empirical techniques, or may use instructions from the end-user or some controlling module, to arbitrate whether a PDU session is adaptable or not. For example, such logic may be stored in, or accessible via, the adaptable PDU arbitrator 222.

The UE 102 may determine whether a current energy mode of the UE 102 is, for example, an energy-saving mode or a low-latency mode, and may accordingly maintain PDU sessions as discussed below. The UE 102 (or a user of the UE 102) may regard various conditions as energy-sensitive conditions. For example, the UE may regard the following as energy-sensitive conditions: while the UE 102 is not charging; the battery percentage is under some threshold; the UE 102 is switched to a power-saving mode; the UE has a relatively small-capacity battery (e.g., when the UE 102 is a watch or bracelet); or a combination of any of these conditions. Conversely, the UE 102 may regard various other conditions as not being energy-sensitive conditions. For example, the UE 102 may regard the following as not being energy-sensitive conditions: while the UE 102 is charging; the battery percentage is above some threshold; the UE 102 is switched to a "gaming" mode; the UE 102 has a relatively high-capacity battery (e.g., a wifi router); the UE 102 is designed to connect to the power cable all the time (e.g., an industrial module); or a combination of any of these conditions.

The energy-sensitive observer 224 may include a database that stores energy-saving criteria (e.g., a charging stage of the device, a battery percentage threshold, whether the device is in gaming mode, whether the device is in power-saving mode, and/or the battery capacity of the device) or other items (e.g., a static or dynamic database, a pair of counters and thresholds, one or more empirical techniques, instructions from an end-user, or some controlling module) to determine an energy-sensitive condition of the UE 102 (e.g., energy-saving mode, low-latency mode). For example, a user may provide input requesting battery-saving mode (energy-sensitive) or gaming mode (non-energy-sensitive, low latency). As another example, on determining that a current energy mode of the UE 102 is an energy-saving mode, when filling in an Uplink Data Status information element (IE) in a service request (toward the network), the UE 102 may establish a PDU session in the non-always-on mode. Conversely, on determining that the current energy mode of the UE 102 is a low-latency mode, the UE 102 may establish the PDU session in an always-on mode.

The adaptable PDU arbitrator 222 and the energy-sensitive observer 224 of FIG. 2 are depicted as residing internal to the UE 102. However, it is understood that either or both of the adaptable PDU arbitrator 222 and the energy-sensitive observer 224 may be partially or wholly located external to the UE 102, for example, in a cloud server, or any other type of device external to the UE 102.

The connection manager 218 further includes one or more PDU session modules 226 to manage various types of PDU sessions. For example, PDU sessions may include, at least, IMS PDU sessions, Internet PDU sessions, and MMS PDU sessions. As an example, a particular PDU session module may determine whether an associated particular PDU session to be established is adaptable. For example, the particular PDU session module may initiate an access to the adaptable PDU arbitrator 222 to determine whether the particular PDU session may be an adaptable PDU session. As used herein, an "adaptable" PDU session is a PDU session that is capable of being established either as an always-on PDU session or a non-always-on session, at the discretion of the UE 102 (e.g., in contrast to a PDU session that is required to be established as an always-on PDU session, by requirement of a particular network, operator, carrier, etc.). Thus, an adaptable PDU session includes a PDU session for which a current particular network, operator, and/or carrier does not specify a requirement of a particular mode of being an always-on or non-always-on PDU session. Hence, a UE may selectively establish an adaptable PDU session in either a non-always-on mode or an always-on mode. For example, the UE may selectively establish an adaptable PDU session in either a non-always-on mode or an always-on mode responsive to a current energy mode of the UE.

In some embodiments, the UE 102 may selectively establish the adaptable PDU session in a non-always-on mode responsive to a determination that the current energy mode of the UE comprises an energy-saving mode. Conversely, the UE 102 may selectively establish an adaptable PDU session in an always-on mode responsive to a determination that the current energy mode of the UE does not comprise the energy-saving mode. For example, the energy-sensitive observer 224 may be used to determine the current energy mode of the UE 102.

In some embodiments, during the non-always-on mode, even if the UE 102 is in connection management (CM) connected state (CM-connected state), the UE 102 may set up a UP connection for one PDU session only if there is uplink data pending. During the always-on mode, if the UE 102 changes from CM idle state (CM-idle) to CM-connected state, the UE 102 sets up the UP connection for the PDU session.

During the energy-saving mode, the UE 102 initiates the service request procedure on an "on-demand" basis, and while not in the energy-saving condition, the UE 102 initiates the service request procedure once a radio resource control (RRC) connection or a data radio bearer (DRB) is released by the network.

In some embodiments, the UE 102 creates non-actionable, or "dummy", uplink data to be used as pending user uplink data to be sent out for the non-always-on PDU session in an always-on mode after a service request procedure completes by choosing a fixed or predefined adaptable PDU session; any one or more adaptable PDU sessions randomly; or all adaptable PDU sessions after the service request procedure completes. The dummy uplink data may include any type of non-actionable or otherwise non-operational data, such as a randomly-generated sequence of bits or symbols, a fixed value or fixed set of values, or data generated or obtained by any other means. As discussed above, the UE 102 considers the energy-sensitive condition when it fills in an Uplink Data Status information element (IE) in a service request. Thus, the UE 102 can manipulate a particular PDU session to, in effect, "pretend" that particular PDU session is always-on for low-latency preferences by utilizing the dummy uplink data for the service request, to "pretend" the particular PDU session actually has pending user data needing to be sent, to request activation of a UP connection, via the service request procedure.

Alternatively, the UE 102 establishes the always-on mode for some specific PDU sessions based on some operator/carrier requirement. For example, a carrier or operator may request or even require that an IMS PDU session operate in the always-on mode to lower the latency. On the other hand, the carrier or operator may not need anything for an internet PDU session.

The service request may be triggered by the UE 102 or by another component of the network 100, such as the base station 112 or the core network 116. If triggered by the UE 102, there may be some uplink data or signaling to be sent. If triggered by another component of the network 100, there may be some downlink data for the UE 102 to receive, so the network 100 uses a paging procedure to trigger the UE 102 to initiate the service request procedure.

The UE 102 may utilize other techniques to determine whether the service request is required or not. For example, as discussed above, while in an energy-sensitive condition, the UE 102 may try to initiate the service request procedure on an "on-demand" basis. While not in an energy-sensitive condition, the UE 102 may attempt to initiate the service request procedure once the RRC connection or the DRB is released by the network.

Figure 3:
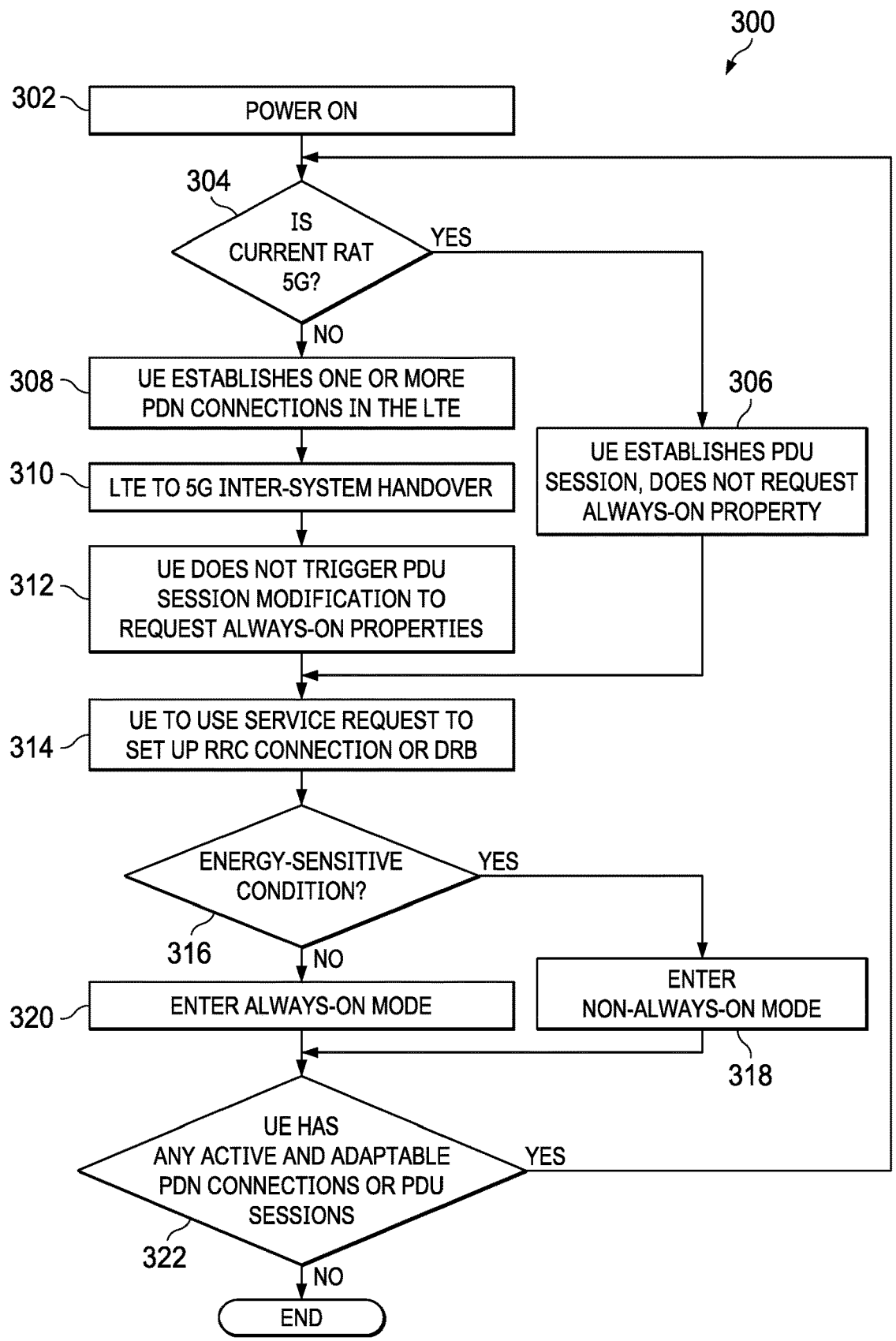
FIG. 3 is a flow chart illustrating a method of providing adaptable protocol data unit (PDU) sessions in accordance with some embodiments.

FIG. 3 illustrates a method 300 of providing an adaptable PDU session for low latency and power saving in accordance with some embodiments. For ease of illustration, FIG. 3 is described in the example context of the wireless communication network 400 of FIG. 4, which may represent the network 100 of FIG. 1. Accordingly, like elements of FIGS. 1-4 are referred to in the present example using like numerals.

At block 302, the UE 102 is powered on or otherwise activated. For example, the UE 102 may be activated by, for example, activation of an "on" button, by plugging in a power cord, by voice activation, or by insertion of a battery or other power source. Other techniques may also be used for powering on or activating a UE, in accordance with the present discussion.

At block 304, responsive to detecting the activated state, the connection manager 218 determines whether a current RAT includes a specified RAT that is prone to PDU session latency due to bring-down/bring-up latency, such as a 5G RAT. For example, this determination may be made prior to the UE 102 attempting to establish an adaptable PDN connection or PDU session. If the connection manager 218 determines that the current RAT includes the specified RAT, at block 306, the UE 102 establishes a PDU session, without requesting an always-on state, and the method 300 proceeds to block 314. In accordance with example techniques discussed herein, adaptable PDU sessions comprise non-always-on PDU sessions.

Otherwise, if the UE 102 does not determine that the current RAT includes the specified RAT, at block 308, the UE 102 establishes one or more PDN connections using a different RAT, such as a LTE RAT. At block 310, the UE 102 then performs RAT handover from the established RAT to the specified RAT, such as a LTE-to-5G handover. For example, the UE 102 may enter an area covered by 5G RAN, and perform the LTE-to-5G handover. At block 312, after entering the 5G network, the UE 102 does not trigger a PDU session modification procedure to request always-on properties for active and adaptable PDU sessions toward the network, as adaptable PDU sessions comprise non-always-on PDU sessions. The method 300 then proceeds to block 314

At block 314, the UE 102 decides to utilize a service request to set up a RRC connection or the DRB, regardless of whether block 314 is reached via block 306 or via block 312.

At block 316, the UE 102 determines whether the UE 102 is currently in an energy-sensitive condition. For example, the UE 102 may determine the current energy-sensitive condition via the energy-sensitive observer 224, discussed above with regard to FIG. 2. If the UE 102 determines that the UE 102 is currently in an energy-sensitive condition, then the UE 102 may infer that saving energy is a priority over lowering latency, and at block 318, the UE 102 enters a non-always-on mode for the PDU session. Even if the UE 102 is in a connected state, the UE 102 may set up a UP connection for one PDU session only if there is pending uplink data to be sent. The method 300 then proceeds to block 322.

Returning to block 316, if the UE 102 determines that the UE 102 is currently not in an energy-sensitive condition, then the UE 102 may infer that lowering latency is a priority over saving energy, and at block 320, the UE 102 enters an always-on mode for the PDU sessions. At this point, PDU sessions mimic always-on mode. When the UE 102 changes from an idle state to a connected state, the UE 102 may always set up the UP connection for a PDU session. The method 300 then proceeds to block 322.

At block 322, the UE 102 determines whether the UE 102 has any PDN connections or PDU sessions that are both active and adaptable. If the UE 102 determines that the UE 102 has any active and adaptable PDN connections or PDU sessions, the method 300 returns to block 304. Otherwise, if the UE 102 determines that the UE 102 does not have any active and adaptable PDN connections or PDU sessions, the method 300 ends.

Figure 4:
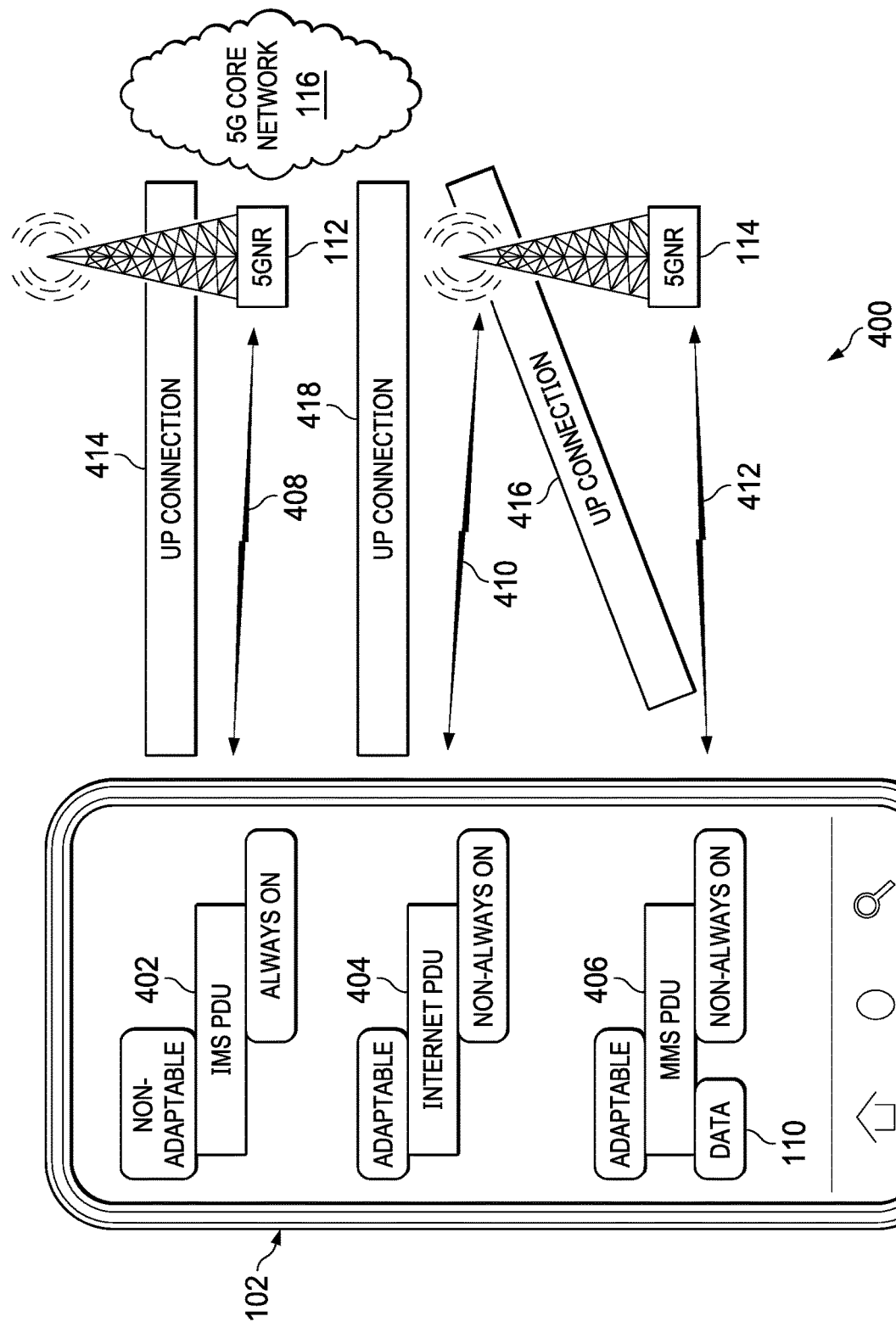
FIG. 4 is a block diagram of an example scenario in which the UE of the wireless communication network of FIG. 1 employs an adaptive PDU session technique in accordance with some embodiments.

FIG. 4 illustrates a wireless communication 400 with the UE 102 in a state of execution with one non-adaptable PDU session and two adaptable PDU sessions, in accordance with the method of FIG. 3. In the depicted example, the UE 102 includes an IMS PDU session module that manages a non-adaptable IMS PDU session 402, an Internet PDU session module that manages an adaptable Internet PDU session 404, and a MMS PDU session module that manages an adaptable MMS PDU session 406. The non-adaptable IMS PDU session 402 is currently in an always-on mode, while the adaptable Internet PDU session 404 and the adaptable MMS PDU session 406 are each in non-always-on mode. The UE 102 and the base station 112 utilize a wireless connection 408 for the non-adaptable IMS PDU session 402, a wireless connection 410 for the adaptable Internet PDU 404 session, and a wireless connection 412 for the adaptable MMS PDU session 406.

In this example, the UE 102 has initially determined that the MMS PDU session 406 is non-adaptable, and that the Internet PDU session 404 and the MMS PDU session 406 are each adaptable (e.g., based on accessing the adaptable PDU arbitrator 222), prior to initially establishing each PDU session. The UE has then initially established the non-adaptable IMS PDU session 402 as an always-on PDU session, and the adaptable PDU sessions as non-always-on PDU sessions.

In this example, the UE 102 has been in CM-idle mode, and the adaptable MMS PDU session 406 (in non-always-on mode) has pending uplink data for transmission. For this example, the UE 102 has determined that the UE 102 is not currently in energy-sensitive mode, prior to initiating a service request with an uplink data status element filled in to indicate UL data pending for all three of the non-adaptable IMS PDU session 402, the adaptable Internet PDU session 404, and the adaptable MMS PDU session 406. The UE 102 has then entered always-on mode, initiating a single service request to establish UP connections for each of the adaptable Internet PDU session 404 and the adaptable MMS PDU session 406.

Thus, the UE 102 has established a UP connection 414 between the core 5G network and the adaptable IMS PDU session 402, a UP connection 416 between the core 5G network and the adaptable MMS PDU session 406, and a UP connection 418 between the core 5G network and the adaptable Internet PDU session 404, in accordance with the example techniques discussed above for adaptable PDU sessions.

In selective activation and deactivation of UP connections, the UE 102 may have multiple PDU sessions active concurrently. For example, in an Evolved Packet System (EPS) network, when the UE 102 moves from an idle state to a connected state, the UP connections (S1 user-plane (S1-U) tunnel) are established for all active PDN connections. One downlink (DL) data paging for a PDN connection makes the UE 102 enter a connected state and the user-plane of all other PDN connections are also activated, thus providing a simple technique and providing always-on connectivity in the system.

As another example, for a 5G system, a UP connection (the corresponding DRB and the N3 network interface tunnel) is only activated for a PDU session that has pending data, while UP connections of other PDU sessions remain idle, even when the UE 102 enters a connected state, resulting in improved isolations between network slices.

A service request message may be used to "wake-up" a UP connection when the UE 102 is in a connected state. However, the use of the service request message may introduce additional delays, since the service request procedure needs to be executed first. Further, there may be additional wait time to complete.

As discussed herein, the always-on PDU session may resolve some potential issues discussed above (e.g., undesirable latency). For example, for IMS or other low-latency services, the UE 102 may choose to activate the corresponding UP connection for the PDU session when the UE 102 moves from an idle state (e.g., CM-idle) to a connected state (e.g., CM-connected), even if there is no actual user data to be sent.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method in a user equipment (UE) comprising:
determining that a protocol data unit (PDU) session comprises an adaptable PDU session;
selectively establishing the adaptable PDU session in either a non-always-on mode or an always-on mode; and
responsive to establishing the adaptable PDU session in the non-always-on mode, selectively mimicking the always-on mode to maintain the adaptable PDU session during the non-always-on mode.

2. The method of claim 1, wherein establishing the adaptable PDU session in the always-on mode includes initiating a service request to request activation of a user plane (UP) connection, wherein initiating the service request includes generating a service request message indicating there is pending user data for transmission.

3. The method of claim 2, further comprising generating dummy data for use as the pending user data.

4. The method of claim 1, wherein determining that the PDU session comprises the adaptable PDU session includes querying a database, prior to establishing the PDU session.

5. The method of claim 1, wherein selectively establishing the adaptable PDU session comprises:
   determining whether a current energy mode of the UE comprises an energy-saving mode;
   in response to determining that the current energy mode of the UE comprises the energy-saving mode, establishing the adaptable PDU session in a non-always-on mode; and
   in response to determining that the current energy mode of the UE does not comprise the energy-saving mode, establishing the adaptable PDU session in an always-on mode.

6. The method of claim 5, wherein determining whether the current energy mode of the UE comprises the energy-saving mode includes determining one or more attributes currently associated with the UE.

7. The method of claim 5, wherein determining whether the current energy mode of the UE comprises the energy-saving mode includes determining whether a current preferred mode of the UE comprises the energy-saving mode or a low-latency mode.

8. The method of claim 1, further comprising:
   responsive to activation of the UE, determining that a network currently available to the UE includes a particular type of radio access technologies (RAT) network; and
   initially establishing a mode of a plurality of adaptable PDU sessions as the non-always-on mode.

9. A non-transitory computer readable medium embodying a set of executable instructions, the set of executable instructions to manipulate at least one processor of a user equipment (UE) to:
   determine that a protocol data unit (PDU) session comprises an adaptable PDU session;
   selectively establish the adaptable PDU session in either a non-always-on mode or an always-on mode; and
   responsive to the adaptable PDU session being established in the non-always-on mode, selectively mimic the always-on mode to maintain the adaptable PDU session during the non-always-on mode.

10. The non-transitory computer readable medium of claim 9, wherein the executable instructions configured to manipulate the at least one processor to selectively establish the adaptable PDU session comprises executable instructions configured to manipulate the at least one processor to:
   determine whether a current energy mode of the UE comprises an energy-saving mode;
   in response to determining that the current energy mode of the UE comprises the energy-saving mode, establish the adaptable PDU session in a non-always-on mode; and
   in response to determining that the current energy mode of the UE does not comprise the energy-saving mode, establish the adaptable PDU session in an always-on mode.

11. The non-transitory computer readable medium of claim 10, wherein the executable instructions configured to manipulate the at least one processor to determine whether the current energy mode of the UE comprises the energy-saving mode include executable instructions configured to manipulate the at least one processor to at least one of:
   determine one or more attributes currently associated with the UE; or
   determine whether a current preferred mode of the UE comprises the energy-saving mode or a low-latency mode.

12. A user equipment (UE) comprising:
   at least one modem configured to communicate using at least one radio access technology (RAT);
   at least one processor coupled to the at least one modem; and
   a memory storing executable instructions configured to manipulate the at least one processor to:
      determine that a protocol data unit (PDU) session comprises an adaptable PDU session;
      selectively establish the adaptable PDU session in either a non-always-on mode or an always-on mode responsive to a current energy mode of the UE; and
      responsive to the adaptable PDU session being established in the non-always-on mode, selectively mimic the always-on mode to maintain the adaptable PDU session during the non-always-on mode.

13. The UE of claim 12, wherein the executable instructions to manipulate the at least one processor to establish the adaptable PDU session in the always-on mode include executable instructions to manipulate the at least one processor to initiate a service request to request activation of a user plane (UP) connection, wherein initiating the service request includes generating a service request message indicating there is pending user data for transmission.

14. The UE of claim 13, wherein the executable instructions to manipulate the at least one processor to establish the adaptable PDU session in the always-on mode further include executable instructions to manipulate the at least one processor to generate dummy data for use as the pending user data.

15. The UE of claim 12, wherein the executable instructions to manipulate the at least one processor to determining that the PDU session comprises the adaptable PDU session comprise executable instructions to manipulate the at least one processor to query a database prior to establishing the PDU session.

16. The UE of claim 12, wherein the executable instructions to manipulate the at least one processor to selectively establish the adaptable PDU session comprise:
   executable instructions to manipulate the at least one processor to determine whether a current energy mode of the UE comprises an energy-saving mode;
   executable instructions to manipulate the at least one processor to, in response to determining that the current energy mode of the UE comprises the energy-saving mode, establish the adaptable PDU session in a non-always-on mode; and
   executable instructions to manipulate the at least one processor to, in response to determining that the current energy mode of the UE does not comprise the energy-saving mode, establish the adaptable PDU session in an always-on mode.

17. The UE of claim 16, wherein the executable instructions to manipulate the at least one processor to determine whether the current energy mode of the UE comprises the energy-saving mode include executable instructions to manipulate the at least one processor to determine one or more attributes currently associated with the UE.

18. The UE of claim 16, wherein the executable instructions to manipulate the at least one processor to determine whether the current energy mode of the UE comprises the energy-saving mode include executable instructions to manipulate the at least one processor to determine whether a current preferred mode of the UE comprises the energy-saving mode or a low-latency mode.

19. The UE of claim 12, wherein the executable instructions further comprise executable instructions to manipulate the at least one processor to:
- responsive to activation of the UE, determine that a network currently available to the UE includes a particular type of radio access technologies (RAT) network; and
- initially establish a mode of a plurality of adaptable PDU sessions as the non-always-on mode.

* * * * *